US006018137A

United States Patent [19]

Reiff

[11] Patent Number: 6,018,137

[45] Date of Patent: Jan. 25, 2000

[54] APPARATUS AND METHOD FOR HEATING COLD ENGINES

[76] Inventor: Robert P. Reiff, S14 W31825 High Meadow Ln., Delafield, Wis. 53028

[21] Appl. No.: 09/112,837

[22] Filed: Jul. 10, 1998

Related U.S. Application Data

[63] Continuation-in-part of application No. 08/706,822, Sep. 3, 1996.

[51] Int. Cl.[7] .................................. B60L 1/02; F02N 1/02

[52] U.S. Cl. ........................................ 219/205; 123/142.5

[58] Field of Search .................................... 219/205, 201, 219/544; 123/142.5, 145, 27 A

[56] References Cited

U.S. PATENT DOCUMENTS

| | | | |
|---|---|---|---|
| 3,953,707 | 4/1976 | Tanis | 219/205 |
| 4,135,079 | 1/1979 | McGraw | 219/327 |
| 4,575,003 | 3/1986 | Linker et al. | 237/12.3 R |
| 4,585,924 | 4/1986 | Pakula | 219/205 |
| 4,675,503 | 6/1987 | Toivid et al. | 219/205 |
| 4,700,888 | 10/1987 | Samulak | 237/2 A |
| 4,776,529 | 10/1988 | Tanis | 244/1 |
| 4,833,299 | 5/1989 | Estes | 219/311 |
| 4,971,576 | 11/1990 | Thimmesch | 439/502 |
| 5,017,758 | 5/1991 | Kirkman et al. | 219/205 |
| 5,040,703 | 8/1991 | Roark et al. | 222/173 |
| 5,196,673 | 3/1993 | Tanis | 219/205 |
| 5,280,158 | 1/1994 | Matava et al. | 219/492 |
| 5,352,862 | 10/1994 | Barr | 219/205 |

*Primary Examiner*—Teresa Walberg
*Assistant Examiner*—Daniel L. Robinson
*Attorney, Agent, or Firm*—Donald J. Ersler

[57] ABSTRACT

An apparatus for heating a cold engine includes a cylinder band heater, a battery heater, an oil sump heater, and a wiring harness. The cylinder band heater includes a heating element, a tightening band, and a cylinder electrical connector. The tightening band is preferably a hose clamp. The heating element is attached to either the inside or outside of the tightening band with preferably some type of adhesive. A thermostat may be on the wiring harness. A battery heater includes a battery heater element, and a battery electrical connector. A thermostat is preferably included between the wiring harness and the battery heater to keep the temperature relatively constant. The wiring harness includes an AC power cord and an AC plug which mate with a 120 volt extension cord. The wiring harness preferably provides a connection to at least one cylinder band heater, a battery heater, and an oil sump heater. The cylinder band heater is tightened around the non-heat sink area of the cylinder. The battery heater may be attached to the battery or placed near the battery.

14 Claims, 4 Drawing Sheets

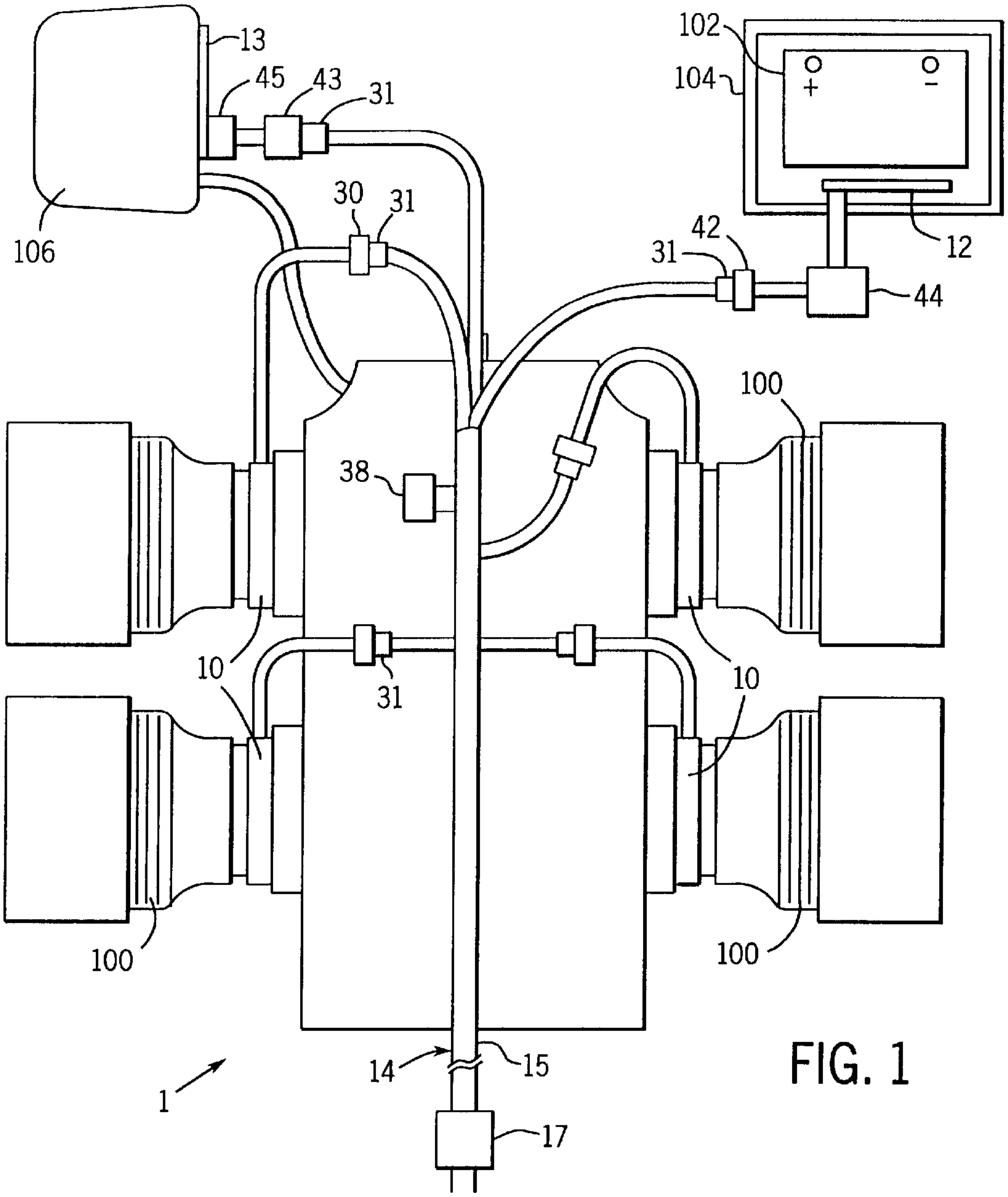
FIG. 1
FIG. 3
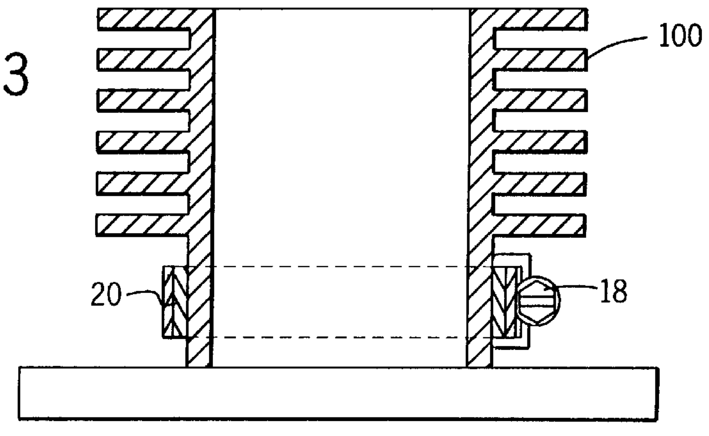

APPARATUS AND METHOD FOR HEATING COLD ENGINES

CROSS-REFERENCES TO RELATED APPLICATIONS

This is a continuation-in-part application, Ser. No. 08/706,822 filed on Sep. 3, 1996.

BACKGROUND OF THE INVENTION

1. Field of the Invention

The present invention relates generally to heating engines and more specifically to an apparatus and method for heating cold cylinders, batteries, and oil sumps.

2. Discussion of the Prior Art

At low temperatures it is often difficult to start internal combustion engines, due to reduced vaporization of fuel, thickened engine oil, reduced battery power, and frost formation on spark plugs. Further, starting an engine in cold weather can cause excessive wear and damage to its internal parts, because of poor oil flow. Wear and damage may also be caused by differing rates of expansion of mating parts made from dissimilar metals. For example, the aluminum pistons expand at a faster rate during startup than the steel cylinders do, which may cause the piston to scuff the cylinder wall.

A common method of preheating aircraft and other engines is to force heated air into an engine compartment. This method is inconvenient because it requires time consuming set-up. The equipment is also not small and light enough to be carried in the aircraft or vehicle. Using a combustion type heater as opposed to an electric heater may be unsafe due to the open flame which heats the forced air.

There are several patents directed at preheating engines. U.S. Pat. No. 3,953,707 to Tanis discloses a method of preheating air cooled aircraft engines by insertion of electric heating devices into blind holes in a cylinder head, normally provided for the reception of thermocouples. The drawback to this design is that the heating element and a thermocouple cannot be simultaneously inserted into the same blind hole. This invention cannot be installed in engines which have no thermocouple holes in the cylinder heads. U.S. Pat. No. 5,196,673 to Tanis discloses an aircraft intake pipe bolt heater. A drawback to both Tanis patents is that both designs directly heat the cylinder head, not the cylinder.

Accordingly, there is a clearly felt need in the art for an apparatus and method for heating cold engines which does not require extensive set-up, does not require extensive disassembly, does not require storage, but provides direct heating of the cylinder, battery, and oil sump.

SUMMARY OF THE INVENTION

The primary objective of the present invention is to provide an apparatus and method for heating cold engines which does not require extensive set-up, does not require extensive disassembly, does not require storage, but provides direct heating of the cylinder, battery, and oil sump.

According to the present invention, an apparatus for heating a cold engine includes a cylinder band heater, a battery heater, an oil sump heater, and a wiring harness. The cylinder band heater includes a heating element, a tightening band, and a cylinder electrical connector. The heating element includes a heating device and insulating layers. The heating device is preferably, a nichrome wire, or a resistive foil element. The nichrome wire is preferably wrapped around a carrier element such as a fiberglass cord. The heating device is sandwiched between first and second insulating layers. The insulating layers are preferably fabricated from silicone fiberglass cloth.

The tightening band is preferably a hose clamp. The heating element is attached to either the inside or outside of the tightening band with some type of adhesive. Preferably, the heating element is attached to the inside thereof for better heat transfer to the cylinder. The cylinder electrical connector includes a two pin connector, a first wire, and a second wire. The first wire is electrically connected to one pin of the two pin connector. The second wire is electrically connected to a second pin in the two pin connector. Each wire is electrically connected to each end of the heating device. All electrical connections are insulated. A thermostat may also be included in the wiring harness to monitor the temperature inside the engine compartment.

A battery heater includes a battery heater element, and a battery electrical connector. The heating element includes a heating device and insulating layers. The heating device is preferably, a nichrome wire or resistive foil element. The resistive foil element is formed by etching thereof from a copper pad, similar to etching runs on a circuit board. The heating device is sandwiched between first and second insulating layers. The insulating layers are preferably fabricated from silicone fiberglass cloth. The electrical connector includes a two pin connector, a first wire, and a second wire. The first wire is electrically connected to one pin of the two pin connector. The second wire is electrically connected to a second pin in the two pin connector. Each wire is electrically connected to each end of the heating device. All electrical connections are insulated. A thermostat is preferably included between the battery electrical connector and the heating element to keep the temperature relatively constant. The construction of oil sump heater is similar to the battery heater except that the oil sump heater has a higher wattage rating and the thermostat has a higher temperature range. The oil sump heater is attached to a bottom of an oil sump.

The wiring harness includes at least one wiring harness connector and an AC power cord. The AC power cord includes an AC plug which mates with a 120 volt extension cord. Each wiring harness connector has two pins. Each pin has a wire attached thereto. The length of the wires connected to each wiring harness connector is dependent upon the position of heating element in the engine compartment. The first wires are connected in parallel and the second wires are connected in parallel.

The apparatus for heating cold engines is installed in the following manner. At least one cylinder band heater is tightened around a cylinder. Preferably, the cylinder band heater is tightened around the non-heat sink area of the cylinder. The cylinder electrical connector is plugged into the mating wiring harness connector. If a battery heater is used, the battery heater is placed near the battery to heat thereof. The battery electrical connector is plugged into the mating wiring harness connector. If an oil sump heater is used, it is attached to an oil sump with a self-adhesive. The AC plug of the wiring harness is plugged into an extension cord and the extension cord plugged into a 120 VAC power source.

Accordingly, it is an object of the present invention to provide an apparatus for heating a cold engine which has a heating element for warming a cylinder in cold weather.

It is a further object of the present invention to provide an apparatus for heating a cold engine which has a heating element for warming a battery in cold weather.

It is yet a further object of the present invention to provide an apparatus for heating a cold engine which has a heating element for warming an oil sump in cold weather.

It is yet a further object of the present invention to provide an apparatus for heating a cold engine which does not require extensive set-up.

It is yet a further object of the present invention to provide an apparatus for heating a cold engine which does not require extensive disassembly.

It is yet a further object of the present invention to provide an apparatus for heating a cold engine which does not require storage.

Finally, it is another object of the present invention to provide an apparatus for heating a cold engine which directly heats a cylinder instead of an intake pipe, or a cylinder head.

These and additional objects, advantages, features and benefits of the present invention will become apparent from the following specification.

BRIEF DESCRIPTION OF THE DRAWINGS

FIG. 1 is a top view of an aircraft engine and battery with an apparatus for heating a cold engine attached thereto in accordance with the present invention;

FIG. 3 is a cross sectional view of a cylinder with a cylinder band heater attached thereto in accordance with the present invention;

DETAILED DESCRIPTION OF THE PREFERRED EMBODIMENTS

Figure 2:
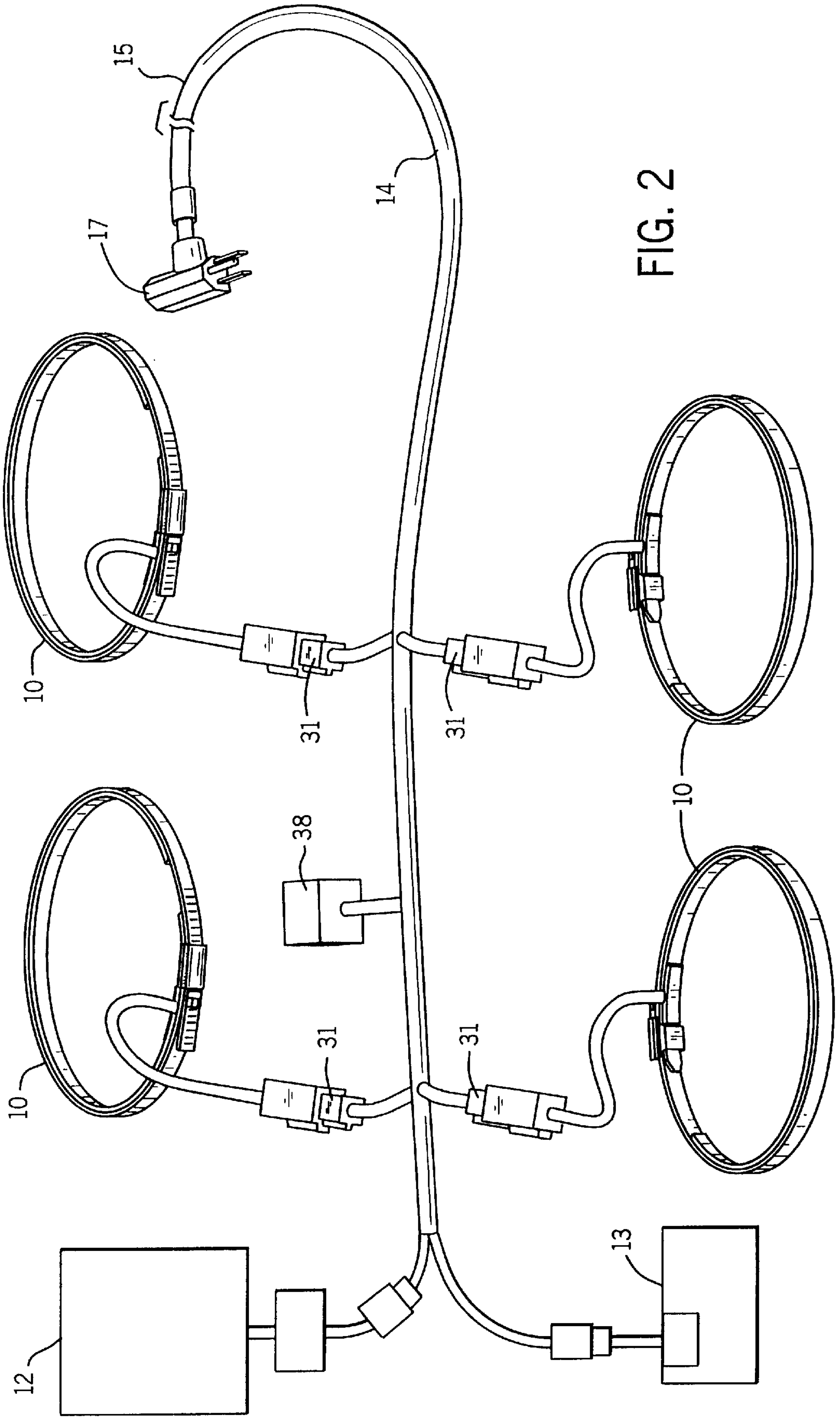
FIG. 2 is a top view of an apparatus for heating a cold engine in accordance with the present invention.
Figure 4:
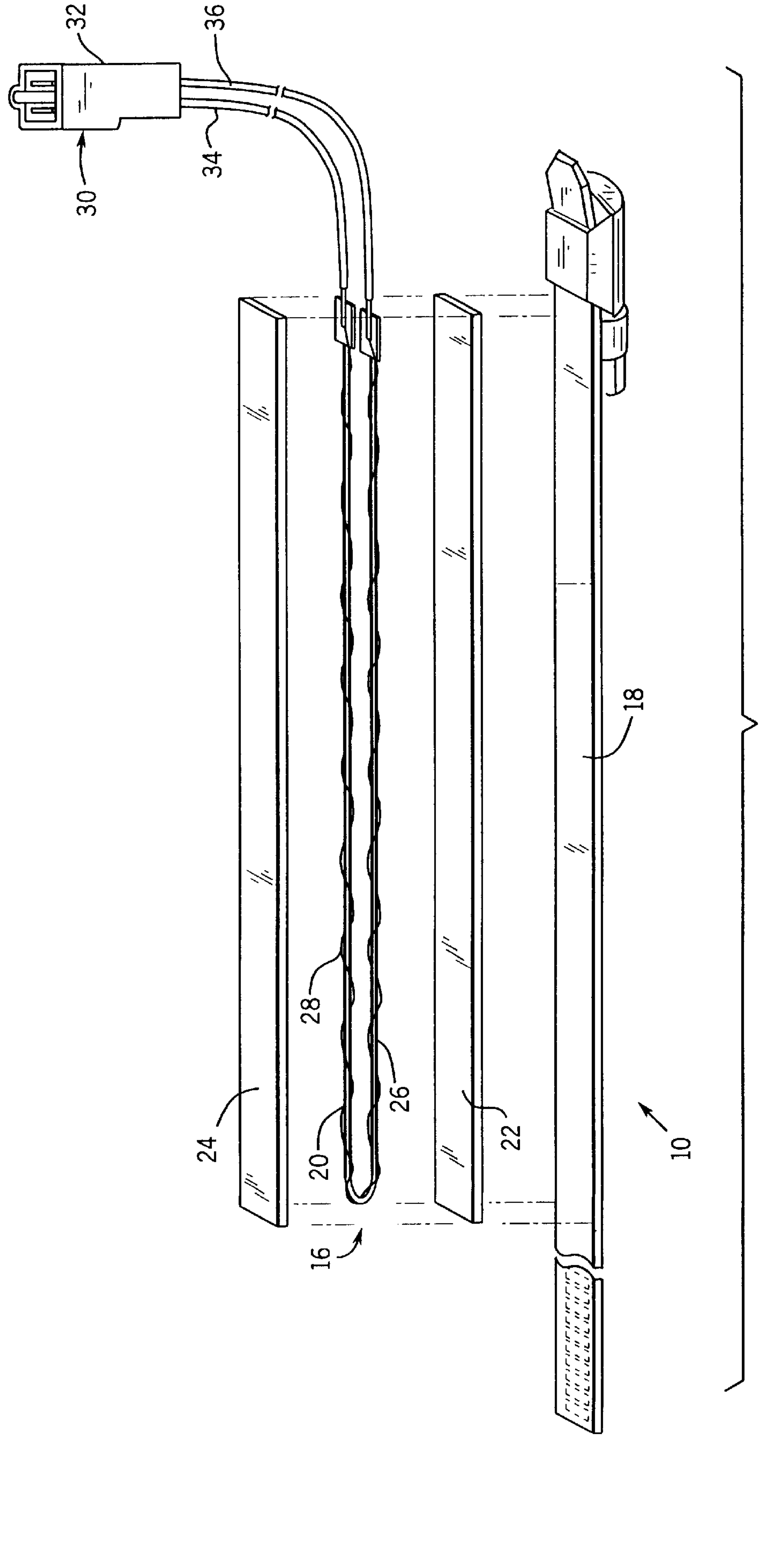
FIG. 4 is an exploded perspective view of a cylinder band heater in accordance with the present invention.

With reference now to the drawings, and particularly to FIG. 1, there is shown an apparatus for heating a cold engine 1. With reference to FIG. 2, the apparatus for heating a cold engine 1 includes a cylinder band heater 10, a battery heater 12, an oil sump heater 13, and a wiring harness 14. With reference to FIG. 4, the cylinder band heater 10 includes a heating element 16, a tightening band 18, and a cylinder electrical connector 30. The heating element 16 includes a heating device 20, a first insulating layer 22 and a second insulating layer 24. The heating device 20 is preferably fabricated from a nichrome wire, or a resistive foil element. The heating device 20 could be fabricated from other wires or other resistive elements, but nichrome wire and resistive foil are preferable, because they provide the best performance and value. The heating device 20 is connected to preferably 120 VAC or 220 VAC; current passes through the heating device 20 and produces heat energy which is conducted through either insulating layer. Preferably, the nichrome wire 28 is wrapped around a carrier element 26 such as a fiberglass cord. The insulating layers are preferably fabricated from silicone fiberglass cloth. The heating device 20 is sandwiched between the first and second insulating layers.

The tightening band 18 is preferably a hose clamp. The width and length of the tightening band 18 may be modified for different sizes of cylinders. The heating element 16 is preferably substantially the same width as the tightening band. The heating element 16 is attached to either the inside or outside of the tightening band 18 with preferably some type of adhesive. Preferably, the heating element 16 is attached to the inside of the tightening band 18 for better heat transfer to a cylinder 100.

The cylinder electrical connector 30 includes a two pin connector 32, a first wire 34, and a second wire 36. The first wire 34 is electrically connected to one pin of the cylinder electrical connector 30. The second wire 36 is electrically connected to a second pin in the cylinder electrical connector 30. Each wire is electrically connected to each end of the heating device. All electrical connections are preferably insulated. A thermostat 38 may be included as part of the wiring harness 14. The thermostat 38 would be preferably connected in series with the hot wire of the AC cord. The thermostat 38 would be disposed on a portion of wiring harness 14 that is within the engine compartment. It is preferable that the temperature range of the thermostat be between 72 to 80 degrees Fahrenheit. A thermostat with an adjustable temperature range could also be used. The thermostat 38 is preferably of the bi-metal type, but other types could be used. Without the thermostat 38, the temperature of the heating element 16 will be approximately 110 degrees Fahrenheit.

Figure 5:
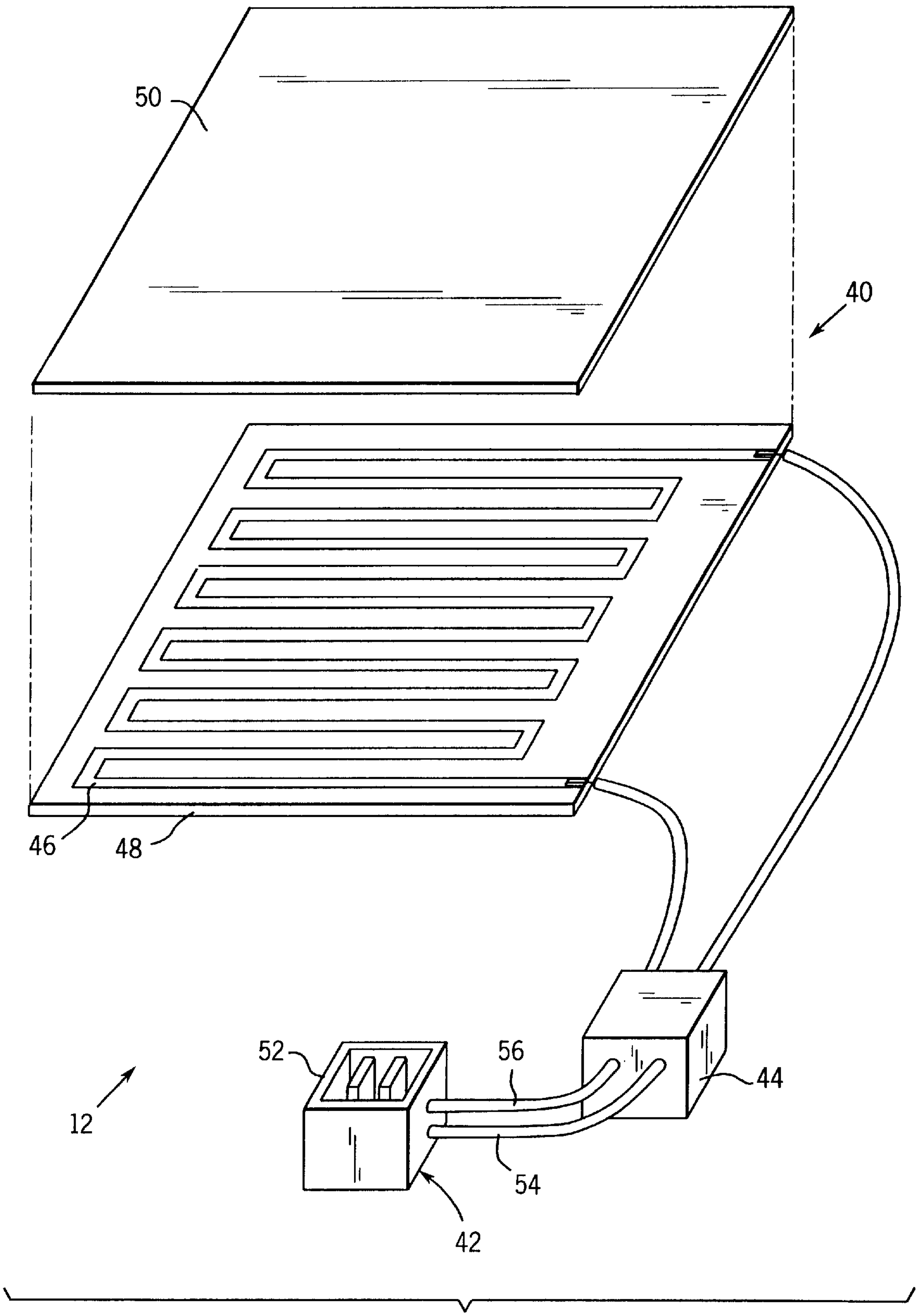
FIG. 5 is an exploded perspective view of a battery or oil sump heater in accordance with the present invention.

With reference to FIG. 5, a battery heater 12 includes a battery heating element 40, a thermostat 44, and a battery electrical connector 42. The heating element 40 includes a heating device 46 a first insulating layer 48 and, a second insulating layer 50. The heating device 46 is preferably, a resistive foil element. The resistive foil element is formed by depositing a thin layer of copper on one of the insulating layers. A pattern is acid etched using a mask. The heating device 46 is sandwiched between the first insulating layer 48 and the second insulating layer 50. The insulating layers are preferably fabricated from silicone fiberglass cloth. The heating device 46 may also be fabricated from nichrome wire and a carrier element instead of the resistive foil element.

The oil sump heater 13 is constructed similar to the battery heater 12. The oil sump heater has a thermostat 45 which has a preferable temperature range of between 140 to 150 degrees Fahrenheit. The oil sump heater 13 has a higher wattage than that of the battery heater 12 to maintain the oil in the oil sump 106 at a temperature near the thermostat range. The back of the oil sump heater 13 preferably has a self-adhesive backing for attachment directly to the oil sump 106. The oil sump electrical connector 43 mates with the wiring harness connectors 31.

The battery electrical connector 42 includes a two pin connector 52, a first wire 54, and a second wire 56. The first wire 54 is connected to one pin of the two pin connector 52. The other end of the first wire 54 is electrically coupled to one end of the heating device 46 through the thermostat 44. The second wire 56 is electrically connected to a second pin of the two pin connector 52. The other end of the second wire 56 is electrically coupled to the other end of the heating device 46 through the thermostat 44. All electrical connections are insulated. The thermostat 44 is preferably included between the wiring harness 14 and the heating element 46 to keep the temperature relatively constant. It is preferable that the temperature range of the thermostat be between 72 to 80 degrees Fahrenheit. The thermostat 44 is preferably of the bi-metal type, but other types could be used.

The wiring harness 14 includes at least one wiring harness connector 31 and an AC power cord 15. The AC power cord 15 includes an AC plug 17 which mates with a 120 volt extension cord. The apparatus for heating a cold engine 1 could also run off 220 VAC with a 220 VAC plug. Each wiring harness connector 31 mates with the cylinder electrical connector 30, the battery electrical connector 42, or the oil sump electrical connector 43. A first wire is attached to one of the pins of the wiring harness connector 31, and a second wire is attached to a second pin thereof. The length of the wires connected to each wiring harness connector 31 are dependent upon the position of the particular heater element in the engine compartment. The first wires from each wiring harness connector 31 are connected in parallel and the second wires from each wiring harness connector 31 are connected in parallel.

The apparatus for heating cold engines 1 is installed in the following manner. With reference to FIG. 3, at least one cylinder band heater 10 is tightened around a cylinder 100. Preferably, the cylinder band heater 10 is tightened around the non-heat sink area of the cylinder 100 to facilitate better heat transfer to thereof. The cylinder electrical connector 30 is then plugged into the mating wiring harness connector 31. The battery heater 12 may be inserted into a battery housing 104 with or without attaching the battery heater 12 to a battery 102. The battery heater 12 may also be attached directly to the outside of the battery housing 104. The battery electrical connector 42 is plugged into the mating wiring harness connector 31. If an oil sump heater is used, an area of the oil sump 106 is cleaned. The contact paper is removed from the back of the oil sump heater 13 and thereof is applied to the cleaned are on the oil sump 106. The AC plug 17 of the wiring harness 14 is plugged into an extension cord and the extension cord plugged into a 120 VAC power source.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An apparatus for heating cold engines comprising:

a wiring harness being connected to a power source;

at least one cylinder band heater including a hose clamp and a heating element, said hose clamp being tightened around a non-heat sink area of a cylinder, said heating element being attached to said hose clamp, said wiring harness supplying current to said heating element.

2. The apparatus for heating cold engines of claim 1, further comprising:

a thermostat being connected in series with said wiring harness, said thermostat being disposed such that it is within the engine compartment.

3. The apparatus for heating cold engines of claim 1, further comprising:

said heating element having a heating device which is sandwiched between a first insulating layer and a second insulating layer.

4. The apparatus for heating cold engines of claim 1, further comprising:

a battery heater being electrically connected to said wiring harness, said battery heater providing heat to a battery.

5. The apparatus for heating cold engines of claim 4, further comprising:

said battery heater having a heating device sandwiched between a first insulating layer and a second insulating layer, said heating device being connected to said wiring harness.

6. The apparatus for heating cold engines of claim 5, further comprising:

a thermostat being connected between said wiring harness and said battery heater.

7. The apparatus for heating cold engines of claim 4, further comprising:

a wiring harness connector extending from said wiring harness for each said heating element, said battery heater being terminated with a battery electrical connector, each said cylinder band heater being terminated with a cylinder electrical connector, said battery electrical connector mating with said wiring harness connector, said cylinder electrical connector mating with said wiring harness connector.

8. The apparatus for heating cold engines of claim 7, further comprising:

an oil sump heater being terminated with an oil sump electrical connector, said oil sump electrical connector mating with said wiring harness connector.

9. An apparatus for heating cold engines comprising:

a wiring harness being connected to a power source;

a battery heater being electrically connected to said wiring harness, said battery heater providing heat to a battery.

at least one cylinder band heater including a hose clamp and a heating element, said hose clamp being tightened around a non-heat sink area of a cylinder, said heating element being attached to said hose clamp, said wiring harness supplying current to said heating element.

10. The apparatus for heating cold engines of claim 9, further comprising:

a thermostat being connected in series with said wiring harness, said thermostat being disposed such that it is within the engine compartment.

11. The apparatus for heating cold engines of claim 9, further comprising:

said heating element having a heating device which is sandwiched between a first insulating layer and a second insulating layer.

12. The apparatus for heating cold engines of claim 9, further comprising:

a thermostat being connected between said wiring harness and said battery heater.

13. The apparatus for heating cold engines of claim 9, further comprising:

a wiring harness connector extending from said wiring harness for each said heating element, said battery heater being terminated with a battery electrical connector, each said cylinder band heater being terminated with a cylinder electrical connector, said battery electrical connector mating with said wiring harness connector, said cylinder electrical connector mating with said wiring harness connector.

14. The apparatus for heating cold engines of claim 13, further comprising:

an oil sump heater being terminated with an oil sump electrical connector, said oil sump electrical connector mating with said wiring harness connector.

* * * * *